US009377764B2

(12) United States Patent
Inoue et al.

(10) Patent No.: US 9,377,764 B2
(45) Date of Patent: Jun. 28, 2016

(54) PLUG LOCK DEVICE

(71) Applicant: KABUSHIKI KAISHA TOKAI RIKA DENKI SEISAKUSHO, Aichi (JP)

(72) Inventors: Tomohiro Inoue, Aichi (JP); Keigo Nishimoto, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 229 days.

(21) Appl. No.: 13/770,469

(22) Filed: Feb. 19, 2013

(65) Prior Publication Data
US 2013/0222111 A1 Aug. 29, 2013

(30) Foreign Application Priority Data

Feb. 24, 2012 (JP) .................. 2012-039098

(51) Int. Cl.
*G05B 1/01* (2006.01)
*B60L 11/18* (2006.01)
*H01R 13/639* (2006.01)

(52) U.S. Cl.
CPC ............... *G05B 1/01* (2013.01); *B60L 11/1818* (2013.01); *H01R 13/6397* (2013.01); *Y02T 10/7005* (2013.01); *Y02T 10/7072* (2013.01); *Y02T 90/14* (2013.01); *Y02T 90/16* (2013.01)

(58) Field of Classification Search
CPC . B60L 11/14; B60L 11/1818; B60L 11/1846; B60L 2010/30; B60L 2240/80; B60L 2250/16; B60L 2270/32; B60L 2270/34; H01R 13/6397; Y02T 10/70; Y02T 10/7005; Y02T 10/7077; Y02T 10/7241; Y02T 90/121; Y02T 90/127; Y02T 90/128

USPC ........................................................ 340/5.65
See application file for complete search history.

(56) References Cited

U.S. PATENT DOCUMENTS

| 5,009,295 A | * | 4/1991 | Kinkade et al. ............ 192/220.2 |
| 5,934,918 A | | 8/1999 | Wuechner |
| 6,898,299 B1 | * | 5/2005 | Brooks ......................... 382/115 |

(Continued)

FOREIGN PATENT DOCUMENTS

| JP | 09-161898 | 6/1997 |
| JP | 2005-194799 | 7/2005 |

(Continued)

OTHER PUBLICATIONS

Japan Office action, mail date is Apr. 14, 2015.

(Continued)

*Primary Examiner* — Omer S Khan
(74) *Attorney, Agent, or Firm* — Greenblum & Bernstein, P.L.C.

(57) ABSTRACT

A plug lock device includes a release switch arranged in a vehicle and a lock mechanism switched between a lock state and an unlock state. The lock mechanism restricts removal of a power plug from an inlet of the vehicle when in the lock state and permits removal of the power plug from the inlet when in the unlock state. The lock mechanism is switched from the lock state to the unlock state when the release switch is operated and wireless communication is established between the vehicle and an authentic electronic key. The lock mechanism is switched to the unlock state even though the wireless communication between the vehicle and the electronic key is not established when the release switch is operated as long as an ignition of the vehicle is activated and a particular switch arranged in the vehicle is operated.

7 Claims, 2 Drawing Sheets

(56) References Cited

U.S. PATENT DOCUMENTS

| | | | |
|---|---|---|---|
| 2007/0285281 A1* | 12/2007 | Welch | G07B 15/02 340/932.2 |
| 2009/0082916 A1 | 3/2009 | Tanaka | |
| 2011/0201223 A1 | 8/2011 | Kurumizawa et al. | |
| 2011/0287649 A1 | 11/2011 | Kurumizawa et al. | |
| 2012/0071017 A1 | 3/2012 | Gaul et al. | |
| 2012/0078443 A1* | 3/2012 | Matsubara | 701/2 |
| 2012/0088382 A1* | 4/2012 | Konchan | 439/153 |
| 2012/0135634 A1 | 5/2012 | Gaul et al. | |
| 2012/0313580 A1* | 12/2012 | Charnesky et al. | 320/109 |

FOREIGN PATENT DOCUMENTS

| | | |
|---|---|---|
| JP | 2009-81917 | 4/2009 |
| JP | 4379823 | 10/2009 |
| JP | 2011-44112 | 3/2011 |
| JP | 2011-244590 | 12/2011 |
| WO | 2010/115927 | 10/2010 |
| WO | 2010/149426 | 12/2010 |

OTHER PUBLICATIONS

China Office action, mail date is Jan. 6, 2015.

* cited by examiner

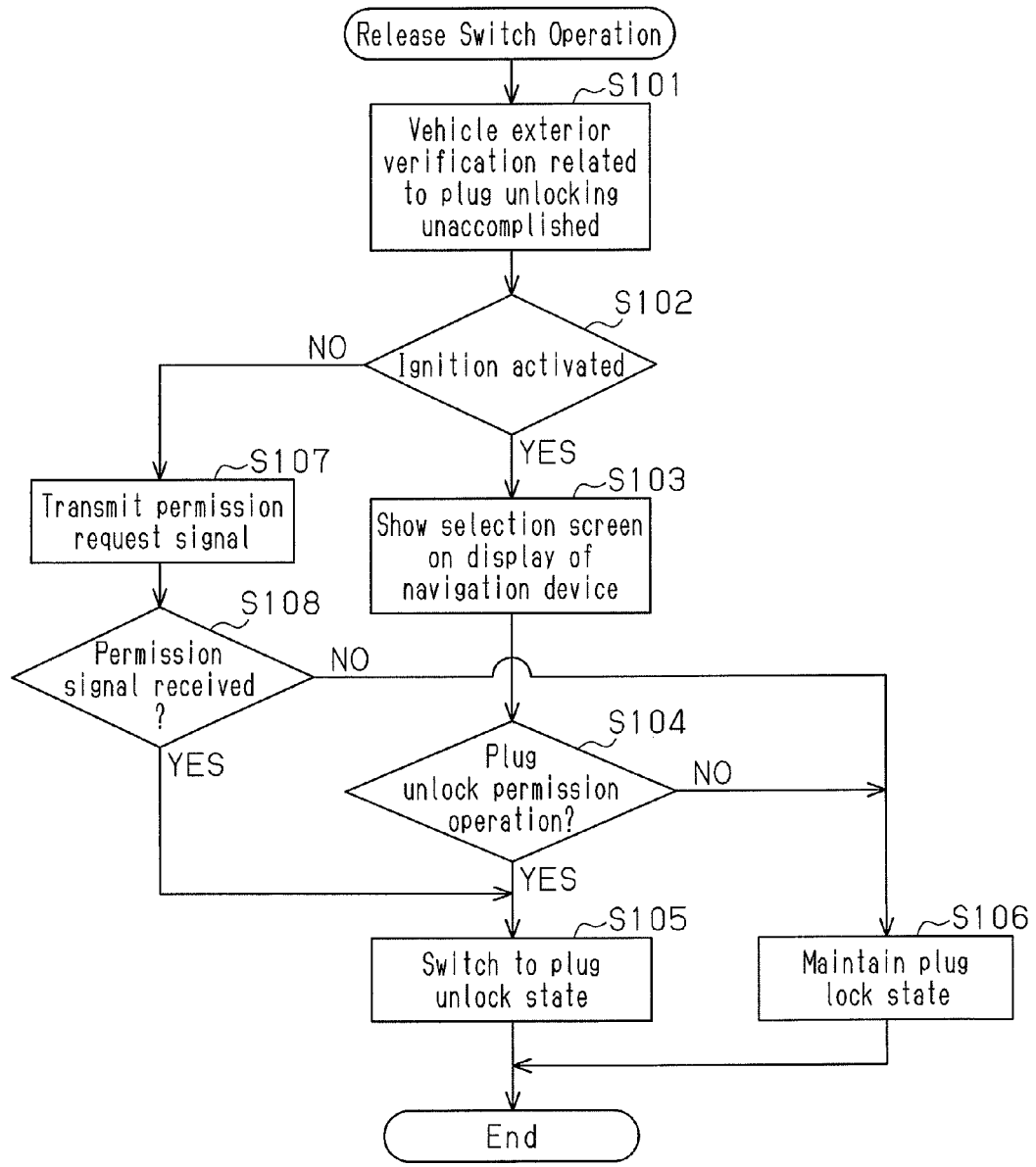

PLUG LOCK DEVICE

CROSS-REFERENCE TO RELATED APPLICATIONS

This application is based upon and claims the benefit of priority from prior Japanese Patent Application No. 2012-039098, filed on Feb. 24, 2012, the entire contents of which are incorporated herein by reference.

FIELD

The present invention relates to a plug lock device.

BACKGROUND

Consumers have become conscious of environmental problems. This has resulted in the popularity of battery-powered electric vehicles. Japanese Laid-Open Patent Publication No. 9-161898 describes one example of an electric vehicle. The electric vehicle includes an inlet that can be connected to a power plug extending from, for example, a household commercial power supply. Power is transmitted from the commercial power supply to the vehicle through the power plug connected to the inlet to charge the vehicle battery.

The charging of a battery for an electric vehicle requires a longer time than filling gasoline into a gasoline vehicle. Thus, an electric vehicle may often be left unattended with the power plug connected to the inlet. As a result, the power plug may be removed from the vehicle and connected to another electric vehicle to steal electricity. Moreover, the power plug may be stolen.

Japanese Patent No. 4379823 describes a plug lock device that locks a power plug to an inlet and restricts unauthorized removal. The power plug lock device unlocks the power plug in cooperation with the unlocking of vehicle doors.

Further, smart systems are installed in recent vehicles. In a smart system, wireless communication is performed between the vehicle and an electronic key carried by a user. The smart system locks or unlocks the vehicle doors and permits the starting of the engine only when the wireless communication is established. Japanese Laid-Open Patent Publication No. 2005-194799 describes one example of a smart system. The smart system intermittently transmits wireless signals on the low frequency (LF) band to form a communication area around the vehicle. When the electronic key enters the communication area and receives an LF band wireless signal, the electronic key transmits a wireless signal on the ultrahigh frequency (UHF) band. When the vehicle determines that the received UHF band wireless signal is valid, the vehicle permits the unlocking of the doors or the like.

SUMMARY

For security reasons, the smart system can also be applied to the plug lock device. For example, an antenna may be arranged in the vicinity of the inlet to transmit wireless signals on the LF band. When the antenna receives a wireless signal and wireless communication is established between the vehicle and the electronic key, the plug lock device permits the removal of the power plug. This structure allows only the user who is carrying the authentic electronic key to remove the power plug. This restricts unauthorized removal of the power plug.

In this structure, however, when a first user who is carrying the electronic key is seated in the vehicle, a second user (passenger) cannot remove the power plug from the inlet. In other words, the first user in the vehicle should get out of the vehicle or hand the electronic key to the second user to have the power plug removed from the inlet. This is inconvenient. Further, when the authentic electronic key is distant from the vehicle and the smart system cannot communicate with the electronic key, even an authorized person, such as the electronic key user's family, cannot remove the power plug. This is inconvenient.

One aspect of the present invention is a plug lock device including a release switch arranged in a vehicle. A lock mechanism is switched between a lock state and an unlock state. The lock mechanism restricts removal of a power plug from an inlet of the vehicle when in the lock state. The lock mechanism permits removal of the power plug from the inlet when in the unlock state. Further, the lock mechanism is switched from the lock state to the unlock state when the release switch is operated and wireless communication is established between the vehicle and an authentic electronic key. The lock mechanism is switched from the lock state to the unlock state even though the wireless communication between the vehicle and the electronic key is not established when the release switch is operated as long as an ignition of the vehicle is activated and a particular switch arranged in the vehicle is operated.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a flowchart showing the processing performed by a charge ECU in the above embodiment.

DESCRIPTION OF THE EMBODIMENTS

Figure 1:
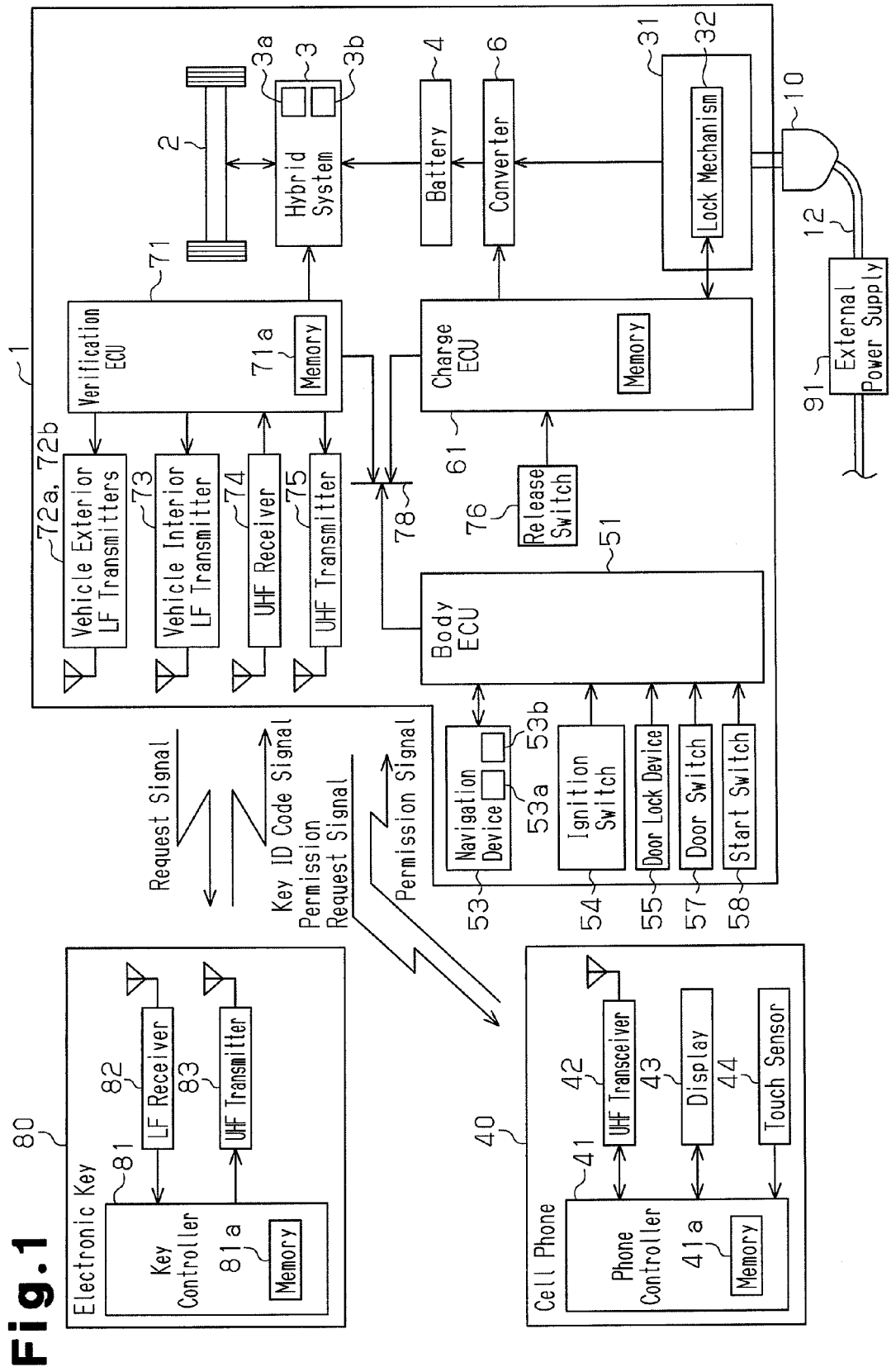
FIG. 1 is a schematic block diagram showing a vehicle, an electronic key, and a cell phone in one embodiment.

One embodiment of a plug lock device will now be described with reference to FIGS. 1 and 2.

Referring to FIG. 1, a hybrid vehicle 1 performs wireless communication with an electronic key 80 to switch the vehicle doors between locked and unlocked states and the permit switching of a power plug between locked and unlocked states. The structures of the electronic key 80 and the vehicle 1 will now be described.

The electronic key 80 includes a key controller 81, an LF receiver 82, and an UHF transmitter 83. The key controller 81 includes a nonvolatile memory 81a that stores a unique key ID code. When the LF receiver 82 receives a request signal on the low frequency (LF) band from the vehicle 1, the key controller 81 transmits a key ID code signal, which includes the key ID code stored in the memory 81a, on the ultrahigh frequency (UHF) band to the vehicle 1.

The vehicle 1 includes a verification electronic control unit (ECU) 71, a charge ECU 61, and a body ECU 51, which serve as in-vehicle devices. The ECUs 51, 61, and 71 can communicate with one another through a vehicle local area network (LAN) 78.

The vehicle 1 includes a hybrid system 3, which combines the powers of an engine 3a and motor 3b when driving drive wheels 2, and a battery 4, which supplies power to the motor 3b. An inlet 31, which receives a power plug 10, is arranged in the side surface of the vehicle 1. When the power plug 10 is fitted to the inlet 31, the power plug 10 is electrically connected to the battery 4 via a converter 6. A charge cable 12 supplies the power plug 10 with power from an external power supply 91. Accordingly, when the power plug 10 is fitted to the inlet 31, AC power from the external power supply 91 can be supplied through the power plug 10 and inlet 31 to the converter 6. The converter 6 converts AC power to DC power and supplies the battery 4 with DC power. The charge ECU 61 controls the converter 6 to control the charging of the battery 4.

The body ECU 51 is connected to a navigation device 53, an ignition switch 54, a door lock device 55, a door switch 57, and a start switch 58.

The door switch 57 is arranged on an outer door handle of a vehicle door. When pushed or touched, the door switch 57 provides a door switch operation signal to the body ECU 51. The start switch 58 is arranged near the driver seat. When the start switch 58 is pushed, the body ECU 51 switches the ignition between an activated state and a deactivated state. The ignition can be switched to OFF, ACC, ON, and START positions. The activated state of the ignition refers to a state in which the ignition is located at the ACC position, ON position, or START position.

The navigation device 53 includes a display 53*a*, which shows maps and the like, and a touch sensor 53*b*, which detects touching of the display 53*a*. The ignition switch 54 outputs a signal indicating whether the ignition is in the activated state or the deactivated state. The touch sensor 53*b* is one example of a touch switch.

The verification ECU 71 includes a memory 71*a* that stores the key ID code of the electronic key 80 and a phone ID code of a cell phone 40. The verification ECU 71 is connected to vehicle exterior LF transmitters 72*a* and 72*b*, a vehicle interior LF transmitter 73, a UHF receiver 74, and a UHF transmitter 75.

The vehicle exterior LF transmitter 72*a* is arranged in the outer door handle and transmits wireless signals on the LF band around the vehicle. The vehicle exterior LF transmitter 72*b* is arranged in the vehicle body proximal to the inlet 31 and transmits wireless signals on the LF band to the vicinity of the inlet 31. The vehicle interior LF transmitter 73 is arranged in the vehicle and transmits wireless signals on the LF band to the interior of the vehicle. The UHF receiver 74 receives wireless signals on the UHF band from the interior and exterior of the vehicle. The UHF transmitter 75 transmits wireless signal on the UHF band to the exterior of the vehicle.

The verification ECU 71 intermittently transmits a request signal on the LF band from the vehicle exterior LF transmitter 72*a* to the surrounding of the vehicle 1. In response to the request signal, the electronic key 80 transmits a key ID code signal in response to the request signal. When the UHF receiver 74 receives the key ID code signal, the verification ECU 71 verifies the key ID code, which is included in the key ID code signal, with the key ID code registered in the memory 71*a*. This is referred to as the vehicle exterior verification related to vehicle door locking and unlocking. When the door switch 57 is operated in a state in which the vehicle exterior verification has been accomplished, the body ECU 51 switches the vehicle doors between locked and unlocked states with the door lock device 55.

After the door is unlocked, when the door opens and the driver enters the vehicle, the verification ECU 71 transmits a request signal to the interior of the vehicle with the vehicle interior LF transmitter 73. When the UHF receiver 74 receives a key ID code signal from the electronic key 80, the verification ECU 71 verifies the key ID code, which is included in the key ID code signal, with the key ID code registered in the memory 71*a*. This is referred to as the vehicle interior verification related to engine starting. When the start switch 58 is operated in a state in which the vehicle interior verification has been accomplished, the body ECU 51 switches the ignition to an ON state and starts the hybrid system 3.

The inlet 31 includes a lock mechanism 32 that locks the power plug 10 to the inlet 31. The lock mechanism 32 is switched between a lock state, which restricts removal of the power plug 10 from the inlet 31, and an unlock state, which permits removal of the power plug 10 from the inlet 31. When the user fits the power plug 10 to the inlet 31, the lock mechanism 32 is automatically switched to the lock state to restrict removal of the power plug 10 from the inlet 31. In this state, power can be supplied from the external power supply 91 to the battery 4 of the vehicle 1.

A release switch 76, which can be operated from the outer side the vehicle, is arranged in the vehicle 1 in the vicinity of the inlet 31. When pushed, the release switch 76 provides a release switch operation signal to the charge ECU 61.

The verification ECU 71 intermittently transmits a request signal on the LF band to the vicinity of the inlet with the vehicle exterior LF transmitter 72*b*. In this state, when the user who is carrying the electronic key 80 is in the vicinity of the inlet 31, the electronic key 80 may receive the request signal. In response to the request signal, the electronic key 80 transmits the key ID code signal. In the same manner as the vehicle exterior verification related to vehicle door locking and unlocking, the verification ECU 71 performs vehicle exterior verification related to unlocking of the power plug 10.

When the verification ECU 71 determines that the vehicle exterior verification related to plug unlocking has been accomplished, the charge ECU 61 switches the lock mechanism 32 from the lock state to the unlock state. This allows the power plug 10 to be removed from the inlet 31.

In this manner, the above structure allows for removal of the power plug 10 when the user carrying the electronic key 80 operates the release switch 76.

In the present embodiment, as long as predetermined conditions are satisfied, the lock mechanism 32 can be shifted to the unlock state even when the user carrying the electronic key 80 is not in the vicinity of the inlet 31 (e.g., when the user carrying the electronic key 80 is seated in the vehicle or is at a distant location). For example, when the vehicle 1 is parked at a house and the user carrying the electronic key 80 is in the house, wireless communication can be performed between the cell phone 40 and the vehicle 1 to switch the lock mechanism 32 to the unlock state.

The cell phone 40 includes a phone controller 41, a UHF transceiver 42, a display 43, and a touch sensor 44. In this example, the cell phone 40 may be a smartphone. The phone controller 41 includes a memory 41*a* that stores a unique phone ID code.

The verification ECU 71 of the vehicle 1 transmits a permission request signal including the phone ID code stored in the memory 71*a* on the UHF band to the cell phone 40 from the UHF transmitter 75.

When the UHF transceiver 42 receives the permission request signal from the vehicle 1, the phone controller 41 verifies the phone ID code, which is included in the permission request signal, with the phone ID code stored in the memory 41*a*. When ID verification has been accomplished, the phone controller 41 has determined that the request was from the correct vehicle 1 and shows a selection screen on the display 43. The selection screen includes an icon used to permit the unlocking of the power plug 10. When the touch sensor 44 detects touching of the icon on the selection screen (plug unlock permission operation), the phone controller 41 transmits a permission signal on the UHF band from the UHF transceiver 42.

The verification ECU 71 of the vehicle 1 receives the permission signal with the UHF receiver 74. When the verification ECU 71 receives the permission signal, the charge ECU 61 switches the lock mechanism 32 to the unlock state and unlocks the power plug 10.

An example of the operation of the charge ECU 61 in which the user who is carrying the electronic key 80 is not in the vicinity of the inlet 31 will now be described with reference to the flowchart of FIG. 2. The execution of the processes shown in the flowchart is started when the release switch 76 is operated.

When the user carrying the electronic key 80 is not in the vicinity of the inlet 31, the verification ECU 71 determines that the vehicle exterior verification related to plug unlocking is unaccomplished (S101). Then, the charge ECU 61 determines with the body ECU 51 whether the ignition is activated (S102). When the ignition is activated (YES in S102), the charge ECU 61 shows the selection screen on the display 53a of the navigation device 53 with the body ECU 51. The selection screen includes the icon used to permit unlocking of the power plug 10. The body ECU 51 determines whether a plug unlock permission operation has been performed with the touch sensor 53b of the navigation device 53. The touch operation is performed by the user who is holding the electronic key 80 in the vehicle.

When the charge ECU 61 determines with the body ECU 51 that the plug unlock permission operation has been performed (YES in S104), the charge ECU 61 switches the lock mechanism 32 to the unlock state (S105). This allows a person who is not carrying the electronic key 80 to remove the power plug 10 from the inlet 31.

When the charge ECU 61 determines with the body ECU 51 that the plug unlock permission operation has not been performed (NO in S104), the charge ECU 61 keeps the lock mechanism 32 in the locked state (S106). This prevents unauthorized removal of the power plug 10 when, for example, the user in the vehicle does not desire so.

Further, when the charge ECU 61 determines in step S102 that the ignition is deactivated (NO in S102), the charge ECU 61 transmits a permission request signal from the verification ECU 71 to the cell phone 40 (S107). Then, the charge ECU 61 determines whether the verification ECU 71 has received the permission signal from the cell phone 40 (S108). When the permission signal has been received (YES in S108), the charge ECU 61 switches the lock mechanism 32 to the unlock state (S105). This allows the person who is not carrying the electronic key 80 to remove the power plug 10 from the inlet 31. When the permission signal is not received (NO in S108), the charge ECU 61 keeps the lock mechanism 32 in the lock state (S106). This prevents removal of the power plug 10 when, for example, the user who is in his or house does not desire the removal.

The present embodiment has the advantages described below.

(1) When the release switch 76 is operated and the electronic key 80 is located in the vehicle, the vehicle exterior verification related to plug unlocking is unaccomplished. In this case, as long as the ignition of the vehicle 1 is activated, the icon used to permit unlocking of the power plug 10 is shown on the display 53a. Then, when a plug unlock permission operation is performed, the lock mechanism 32 is switched from the lock state to the unlock state. This allows a person who is not carrying the electronic key 80 to remove the power plug 10 and thereby improves user convenience. Further, the conditions for switching the lock mechanism 32 to the unlock state include activation of the ignition and the performance of an unlock permission operation on the display 53a. This prevents unauthorized removal of the power plug 10. Thus, the level of security can be maintained.

(2) The power plug 10 can be unlocked from inside the vehicle. Thus, the person carrying the electronic key 80 does not have to exit the vehicle. This increases convenience. Further, the icon that is shown on the display 53a in the vehicle 1 is touched. This eliminates the need for an additional dedicated switch, and simplifies the structure.

(3) Even when the ignition of the vehicle is deactivated, the power plug 10 can be unlocked by the cell phone 40. This allows a person who is not carrying the electronic key 80 to remove the power plug 10 even when the electronic key 80 is located away from the vehicle 1.

It should be apparent to those skilled in the art that the present invention may be embodied in many other specific forms without departing from the spirit or scope of the invention. Particularly, it should be understood that the present invention may be embodied in the following forms.

In the above embodiment, the request signal is intermittently transmitted. Instead, the request signal may be transmitted when the release switch 76 is operated. In this case, upon accomplishment of the vehicle exterior verification related to plug unlocking, which is based on the request signal transmitted when the release switch 76 is operated, the lock mechanism 32 is switched to the unlock state. In the same manner, the request signal may be transmitted when the door switch 57 is operated. Further, the charge ECU 61 may switch the lock mechanism 32 from the lock state to the unlock state based on the result of the vehicle exterior verification related to vehicle door locking and unlocking. In this case, the range in which the request signal from the vehicle exterior LF transmitter 72a is transmitted may be expanded to include the vicinity of the inlet 31. This allows for omission of the vehicle exterior LF transmitter 72b from the vicinity of the inlet 31.

In the above embodiment, the contents of the controls executed by the ECUs 51, 61, and 71 can be changed. For example, the functions of the ECUs 51, 61, and 71 may be partially or entirely integrated. Further, a new ECU may be added. For example, a plug lock ECU may be provided separately from the charge ECU 61 to control plug locking and unlocking. In this case, the plug lock ECU switches the lock mechanism 32 between lock and unlock states.

In the above embodiment, when the cell phone 40 receives the permission request signal, the cell phone 40 may show a selection screen on the display and generate a voice message or vibration to notify the user of such a situation.

In the above embodiment, the display 53a of the navigation device 53 is touched to permit unlocking of the power plug 10. However, the unlocking of the power plug 10 may be permitted by operating a switch on the navigation device 53 or a switch on the steering wheel. When using a steering wheel switch, a selection screen may be shown in the instrument panel. Further, a dedicated switch for permitting unlocking of the power plug 10 may be arranged in the vehicle. Such a dedicated switch may also be arranged outside the vehicle.

When the ignition is activated and a particular operation is performed on the release switch 76, the charge ECU 61 may switch the lock mechanism 32 to the unlock state even when vehicle exterior verification related to plug unlocking is unaccomplished. More specifically, when a first operation is performed on the release switch 76 but wireless communication cannot be established between the vehicle 1 and the electronic key 80, the lock mechanism 32 can be switched from the lock state to the unlock state as long as the ignition is activated and, at the same time, a second operation is performed on the release switch 76. The first operation is, for example, a short push of the release switch 76. The second operation is, for example, consecutive pushes of the release switch 76, a long push of the release switch 76, or a combination of these operations.

In the above embodiment, permission request signals and permission signals are transferred on the UHF band between the cell phone 40 and the vehicle 1. However, there is no limitation to such a configuration as long as wireless communication can be performed between the cell phone 40 and the vehicle 1. For example, the permission request signals and permission signals may be transferred through network communication. This allows for unlocking of the power plug 10 even when the user carrying the cell phone 40 is at a location that is further distant from the vehicle 1.

In the above embodiment, the verification ECU 71 of the vehicle 1 authenticates the cell phone 40 by verifying the phone ID code. Instead, the cell phone 40 may authenticate the vehicle 1. In this case, the cell phone 40 verifies the vehicle ID code that is included in the permission request signal. Further, the cell phone 40 and the vehicle 1 may authenticate each other.

In the above embodiment, when the user is at a location distant from the vehicle, wireless communication between the cell phone 40 and the vehicle 1 allows the power plug 10 to be unlocked. Such a function of the cell phone 40 may be provided in the electronic key 80. In this case, the electronic key 80 receives a permission request signal with a UHF receiver and notifies the user of such a situation. The notification may be performed by generating a message using a display, voice, light, or vibration. Then, an operation for permitting unlocking is performed on the electronic key 80. The operation may be performed using a dedicated switch or by long pushing or simultaneous pushing of convention door lock and door unlock switches. When an unlock permission operation is performed, the electronic key 80 transmits a permission signal to the vehicle 1.

In the above embodiment, the cell phone 40 is a smartphone but may be a normal cell phone instead. The cell phone 40 may also be a portable device that does not have a phone function as long as communication can be established with the vehicle 1.

In the above embodiment, the vehicle 1 is of a hybrid type but may be an electric vehicle.

The present examples and embodiments are to be considered as illustrative and not restrictive, and the invention is not to be limited to the details given herein, but may be modified within the scope and equivalence of the appended claims.

The invention claimed is:

1. A plug lock device comprising:
   a release switch arranged in a vehicle and configured to output, when operated, a release switch operation signal;
   a lock mechanism switched between a lock state and an unlock state, wherein the lock mechanism restricts removal of a power plug from an inlet of the vehicle when in the lock state, the lock mechanism permits removal of the power plug from the inlet when in the unlock state; and
   an electronic control unit (ECU) arranged in the vehicle and capable of:
      transmitting a wireless signal to a vicinity of the inlet and performing vehicle exterior verification related to unlocking of the power plug by receiving a key ID code signal from an electronic key that is located in the vicinity of the inlet, and
      transmitting a wireless signal to an interior of the vehicle and performing vehicle interior verification by receiving the key ID code signal from the electronic key that is located within the interior of the vehicle,
   wherein the ECU is configured so that:
      the ECU automatically switches the lock mechanism from the lock state to the unlock state when the ECU receives the release switch operation signal and determines that the vehicle exterior verification is accomplished,
      when the ECU receives the release switch operation signal and determines that the vehicle exterior verification is unaccomplished, the ECU automatically switches the lock mechanism from the lock state to the unlock state as long as the ECU determines that an ignition of the vehicle is activated by accomplishment of the vehicle interior verification and a particular switch arranged in the vehicle is operated, and
      the ECU activates the ignition when vehicle interior verification through wireless communication with the electronic key which is located in the vehicle is accomplished.

2. The plug lock device according to claim 1, wherein even though the vehicle exterior verification is unaccomplished when a first operation is performed on the release switch, the ECU switches the lock mechanism from the lock state to the unlock state as long as the ignition is activated and a second operation that differs from the first operation is performed on the release switch.

3. The plug lock device according to claim 1, wherein the particular switch is either one of:
   a switch on a navigation device arranged within the vehicle;
   a switch on a steering wheel arranged within the vehicle; and
   a dedicated switch, arranged in the vehicle, for permitting unlocking of the power plug.

4. The plug lock device according to claim 1, wherein if the ignition is deactivated in a state in which the vehicle exterior verification is unaccomplished when the release switch is operated, the ECU performs wireless communication with a portable device carried by a user of the electronic key, and
   the ECU switches the lock mechanism from the lock state to the unlock state when the ECU receives a permission signal permitting unlocking of the power plug from the portable device.

5. The plug lock device according to claim 1, wherein the particular switch includes a touch switch that detects an operation performed on a display arranged in the vehicle.

6. The plug lock device according to claim 4, wherein
   the wireless communication between the ECU and the portable device is performed by using radio waves on a ultrahigh frequency band for bidirectional communication, and
   the vehicle exterior verification through wireless communication between the ECU and the electronic key is performed using radio waves on a low frequency band for communication in at least one direction.

7. A plug lock device comprising:
   a release switch arranged in a vehicle and configured to output, when operated, a release switch operation signal;
   a lock mechanism switched between a lock state and an unlock state, wherein the lock mechanism restricts removal of a power plug from an inlet of the vehicle when in the lock state, the lock mechanism permits removal of the power plug from the inlet when in the unlock state; and an electronic control unit (ECU) arranged in the vehicle and capable of:

transmitting a wireless signal to a vicinity of the inlet and performing vehicle exterior verification related to unlocking of the power plug receiving a key ID code signal from an electronic key that is located in the vicinity of the inlet, and transmitting a wireless signal to an interior of the vehicle and performing vehicle interior verification by receiving the key ID code signal from the electronic key that is located within the interior of the vehicle, wherein the ECU is configured so that:

the ECU automatically switches the lock mechanism from the lock state to the unlock state when the ECU receives the release switch operation signal and determines that the vehicle exterior verification is accomplished, when a first operation is performed on the release switch and when the ECU receives the release switch operation signal and determines that the vehicle exterior verification is unaccomplished, the ECU automatically switches the lock mechanism from the lock state to the unlock state as long as the ECU determines that an ignition of the vehicle is activated by accomplishment of the vehicle interior verification and a second operation that differs from the first operation is performed on the release switch, and the ECU activates the ignition when vehicle interior verification through wireless communication with the electronic key which is located in the vehicle is accomplished.

* * * * *